US009544942B2

United States Patent
Kanamarlapudi et al.

(10) Patent No.: US 9,544,942 B2
(45) Date of Patent: Jan. 10, 2017

(54) DCH TO NON-DCH STATE SWITCHING OF USER EQUIPMENT IN UMTS

(71) Applicant: QUALCOMM Incorporated, San Diego, CA (US)

(72) Inventors: Sitaramanjaneyulu Kanamarlapudi, San Diego, CA (US); Sharif Matin, San Diego, CA (US); Deepu Alex, San Diego, CA (US); Ansah Ahmed Sheik, Eluru (IN)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 14/470,350

(22) Filed: Aug. 27, 2014

(65) Prior Publication Data

US 2015/0237672 A1 Aug. 20, 2015

Related U.S. Application Data

(60) Provisional application No. 61/941,260, filed on Feb. 18, 2014.

(51) Int. Cl.
| | | |
|---|---|---|
| *H04W 76/04* | (2009.01) | |
| *H04L 1/18* | (2006.01) | |
| *H04W 52/02* | (2009.01) | |

(52) U.S. Cl.
CPC .......... *H04W 76/046* (2013.01); *H04L 1/1858* (2013.01); *H04W 52/0212* (2013.01); *H04W 52/0251* (2013.01)

(58) Field of Classification Search
None
See application file for complete search history.

(56) References Cited

U.S. PATENT DOCUMENTS

| | | | | |
|---|---|---|---|---|
| 2003/0174686 A1* | 9/2003 | Willenegger | ......... | H04L 1/0071 370/342 |
| 2005/0176437 A1* | 8/2005 | Mir | ....................... | H04W 56/00 455/450 |
| 2008/0014875 A1* | 1/2008 | Farnsworth | ......... | H04W 76/064 455/114.2 |

(Continued)

FOREIGN PATENT DOCUMENTS

EP      1 981 224 A1     10/2008

OTHER PUBLICATIONS

International Search Report and Written Opinion—PCT/US2015/015553—ISA/EPO—May 15, 2015. (10 total pages).

*Primary Examiner* — Ayaz Sheikh
*Assistant Examiner* — Peter Chau
(74) *Attorney, Agent, or Firm* — Arent Fox LLP

(57) ABSTRACT

A method and apparatus for radio resource control (RRC) state transitions of a user equipment (UE) are provided. For the RRC state transitions of the UE, for example, a reconfiguration message is received at the UE while the UE is in a cell dedicated channel (CELL_DCH) state of the RRC states. The reconfiguration message is configured to transition the UE from the CELL_DCH state to a non-dedicated channel state of RRC states. A plurality of acknowledgement procedures is sent on an uplink to the network, in response to the received reconfiguration message causing the UE to transition from the CELL_DCH state to the non-dedicated channel state.

20 Claims, 8 Drawing Sheets

(56) References Cited

U.S. PATENT DOCUMENTS

| | | | |
|---|---|---|---|
| 2009/0023436 A1* | 1/2009 | Wu | H04W 24/10 |
| | | | 455/419 |
| 2009/0129406 A1* | 5/2009 | Hwang | H04L 1/16 |
| | | | 370/469 |
| 2011/0002289 A1* | 1/2011 | Gerstenberger | H04W 56/003 |
| | | | 370/329 |
| 2011/0194433 A1* | 8/2011 | Song | H04W 76/046 |
| | | | 370/252 |
| 2011/0195715 A1 | 8/2011 | Wu | |
| 2012/0264416 A1* | 10/2012 | Pica | H04W 76/046 |
| | | | 455/422.1 |
| 2013/0122918 A1* | 5/2013 | Boley | H04W 76/046 |
| | | | 455/450 |
| 2014/0301235 A1* | 10/2014 | Ahn | H04L 1/0027 |
| | | | 370/252 |

\* cited by examiner

DCH TO NON-DCH STATE SWITCHING OF USER EQUIPMENT IN UMTS

CLAIM OF PRIORITY UNDER 35 U.S.C. §119

This present application for patent claims priority to U.S. Provisional Application No. 61/941,260, titled "DCH TO FACH SWITCHING OF OPTIMIZATION IN UMTS," filed on Feb. 18, 2014, and assigned to the assignee hereof and hereby expressly incorporated by reference herein.

BACKGROUND

Aspects of the present disclosure generally relate to wireless communications, and more particularly, to techniques for transitioning from a radio resource control (RRC) state to another RRC state of a user equipment (UE).

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

The aspects of the present disclosure will become more fully understood upon a review of the detailed description, which follows.

The present disclosure provides techniques for reducing state transition time, reducing power consumption, and/or increasing probability of correct reception of an acknowledgment procedure of a reconfiguration message (e.g., a radio bearer reconfiguration message to switch from a cell dedicated channel state, such as CELL_DCH state, to a non-dedicated channel state, such as CELL_FACH state) from a network (e.g., Node B). In an aspect, the same status packet data unit (e.g., STATUS PDU with Acknowledgement (ACK) Super-Field (SUFI) for the reconfiguration message) is sent to the network on the uplink multiple times. That is, duplicate ACK transmissions or multiple signaling of ACK, e.g., 3 or 4 times are transmitted in one or more next possible uplink (UL) or enhanced uplink (EUL) transmit time intervals (TTIs). Additionally, the described aspects herein allow the UE to discard any wait period, and allow the UE to initiate transitioning of a radio resource control (RRC) state of the UE to a non-dedicated channel state, such as FACH or enhanced FACH (eFACH) state (e.g., CELL_FACH state) immediately after a set of duplicate ACK transmissions has been completed, thereby reducing the state transition time, power consumption, and/or increasing probability of correct reception of an acknowledgment procedure of a reconfiguration message from the network.

In an aspect, the present disclosure provides an example of a method of transitioning RRC states of a user equipment (UE). While the UE is operating in the CELL_DCH state of RCC states, a reconfiguration message is received from a network. The reconfiguration message is configured to transition the UE from the CELL_DCH sate to a non-dedicated channel state of the RRC states. In response to the received reconfiguration message causing the UE to transition from the CELL_DCH state to the non-dedicated channel state, a plurality of acknowledgement procedures is sent to the network on an unlink. The reconfiguration message may be a radio bearer reconfiguration message.

In another aspect, the present disclosure provides an example of an apparatus for transitioning RRC states of a user equipment for wireless communications. The apparatus includes various means for or components configured to receive a reconfiguration message from a network, while the UE is in a CELL_DCH state of the RRC states. The reconfiguration message is configured to transition the UE from the CELL_DCH state to a non-dedicated channel state of the RRC states. The apparatus further includes means for or a component configured to send a plurality of acknowledgment procedures to the network on an uplink, in response to the received reconfiguration message causing the UE to transition from the CELL_DCH state to the non-dedicated channel state of the RRC states. The reconfiguration message may be a radio bearer reconfiguration message.

In another aspect, the present disclosure provides an example of a RRC state transition component of a user equipment for wireless communications. The RRC state transition component includes various components including a receiving component, a sending component, and optionally an initiating component. The receiving component is configured to receive a reconfiguration message (e.g., a radio bearer reconfiguration message) from a network, while the UE is in a CELL_DCH state of RRC states, in which the reconfiguration message is configured to transition the UE from the CELL_DCH state to a non-dedicated channel state of the RRC states. The sending component is configured to send a plurality of acknowledgment procedures on an uplink to the network, in response to the received reconfiguration message causing the UE to transition from the CELL_DCH state to the non-dedicated channel state. The reconfiguration message may be a radio bearer reconfiguration message. The initiating component may be configured to initiate one or more procedures to transition the RRC state of the UE to the non-dedicated channel state.

In still another aspect, the present disclosure provides an example of a computer readable medium storing computer executable code. The computer readable medium includes code for receiving a reconfiguration message from a network while a user equipment is in a CELL_DCH state of RRC states. The reconfiguration message is configured to transition the UE from the CELL_DCH state to a non-dedicated channel state of the RRC states. The computer readable medium further includes code for sending a plurality of acknowledgment procedures to the network on an uplink, in response to the received reconfiguration message causing the UE to transition from the CELL_DCH state to the non-dedicated channel state of the RRC states. The reconfiguration message may be a radio bearer reconfiguration message.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A radio resource control (RRC) state transition from a cell dedicated channel state to a non-dedicated channel state (e.g., from CELL_DCH state to CELL_FACH state) may be an issue for a user equipment (UE). It is usually an unsynchronized procedure, and generally there is no practical network across the globe which provides any activation time for such a transition. The specification (e.g., 3GPP TS 34.121) is also open on various aspects of synchronizing the RRC state transitions.

Further, in this RRC procedure, the UE may discard the CELL_DCH state, undergo a cell selection procedure based on radio frequency (RF) conditions and then execute a Cell Update (CU) procedure to a newly acquired cell. Based on the RF conditions, this CU procedure may take a relatively long time. If a layer 2 (L2) acknowledgment procedure (e.g., L2 ACK) for a reconfiguration message, such as a radio bearer reconfiguration message (e.g., a RB Reconfig message) during the CELL_DCH state, which triggers a state transition from CELL_DCH to CELL_FACH, reaches a network (e.g., Node B) late due to uplink (UL) block error rate (BLER), the NodeB can set Radio Link Control (RLC) Reset in the signaling bearer causing a call drop. BLER is a ratio of the number of erroneous blocks received to the total number of blocks sent and the erroneous block include a transport block, the cyclic redundancy check (CRC) of which is wrong (see 3GPP TS 34.121, which is incorporated herein by reference).

Figure 1:
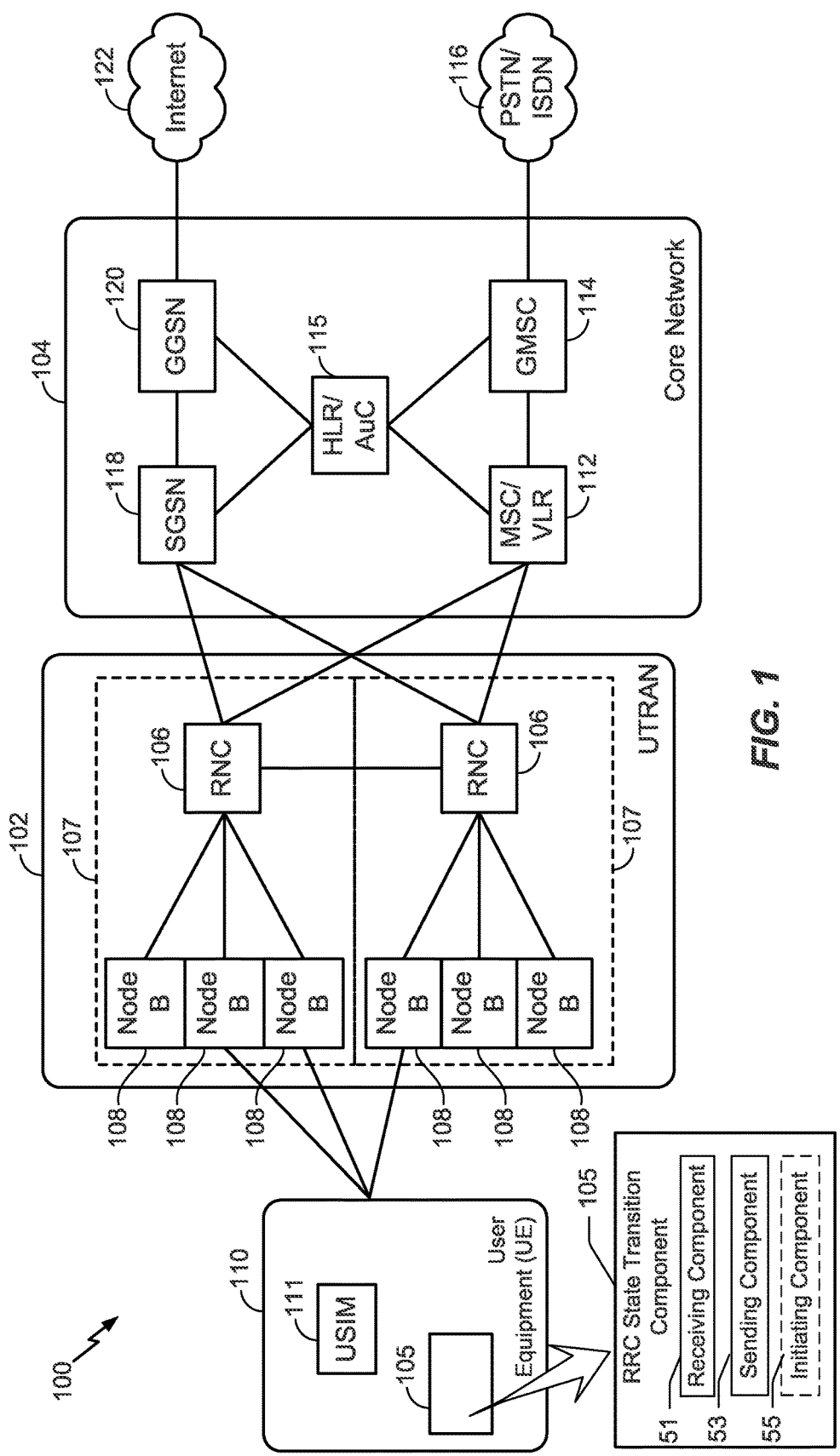
FIG. 1 is a block diagram conceptually illustrating an example of a telecommunications system.

On the other hand, the UE cannot wait indefinitely at the CELL_DCH state just to make sure the layer 2 acknowledgment procedure (e.g., L2 ACK) has been received at the network (NW) properly or not, because of its longer use of the power/current during the CELL_DCH state. Also, the UE may defer any FACH procedures and successive communications with the network. These issues become more acute at the advent of different smartphone applications, which may involve many frequent DCH/FACH transitions (e.g., RRC state transitions from CELL_DCH to CELL_FACH, or from CELL_FACH to CELL_DCH), which are addressed by various aspects of the present disclosure. The various concepts presented herein may be implemented across a broad variety of telecommunication systems, network architectures, and communication standards. By way of example and without limitation, the aspects of the present disclosure illustrated in FIG. 1 are presented with reference to a UMTS system 100 employing a W-CDMA air interface. A UMTS network includes three interacting domains: a Core Network (CN) 104, a UMTS Terrestrial Radio Access Network (UTRAN) 102, and User Equipment (UE) 110. In this example, the UTRAN 102 provides various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the RNCs 106 and RNSs 107 illustrated herein. The RNC 106 is an apparatus responsible for, among other things, assigning, reconfiguring and releasing radio resources within the RNS 107. The RNC 106 may be interconnected to other RNCs (not shown) in the UTRAN 102 through various types of interfaces such as a direct physical connection, a virtual network, or the like, using any suitable transport network.

Communication between a UE 110 and a Node B 108 may be considered as including a physical (PHY) layer and a medium access control (MAC) layer. Further, communication between a UE 110 and an RNC 106 by way of a respective Node B 108 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the serving RNS (SRNS) 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each SRNS 107; however, the SRNSs 107 may include any number of wireless Node Bs. The Node Bs 108 provide wireless access points to a core network (CN) 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network.

For illustrative purposes, one UE 110 is shown in communication with a number of the Node Bs 108. Further, the UE 110 includes a radio resource control (RRC) state transition component 105, which includes various means for or components configured to implement functions relating to aspects of the present disclosure. By way of example, the RRC state transition component 105 includes a receiving component 51, a sending component 53, and optionally an initiating component 55, which are described in detail below. The receiving component 51 is means for or a component configured to receive a reconfiguration message (e.g., a radio bearer reconfiguration message) from a network, while the UE is in a CELL_DCH state of the RRC states. The reconfiguration message is configured to transition the UE from the CELL_DCH state to a non-dedicated channel state, such as cell forward access channel (CELL_FACH) state of the RRC states. The sending component 53 is means for or a component configured to send to a plurality of acknowledgment procedures to the network on an unplink, in response to the received reconfiguration message (e.g., the radio bearer reconfiguration message) causing the UE to transition from CELL_DCH state to non-dedicated channel state of the RRC states. The initiating component 55 is means for or a component configured to initiate one or more procedures to transition the RRC state of the UE to the CELL_FACH state.

In an aspect, the term "component" as used herein may be one of the parts that make up a system, may be hardware or software, and may be divided into other components.

The downlink (DL), also called the forward link, refers to the communication link from a Node B 108 to the UE 110, and the uplink (UL), also called the reverse link, refers to the communication link from the UE 110 to a Node B 108.

The core network 104 interfaces with one or more access networks, such as the UTRAN 102. As shown, the core network 104 is a GSM core network. However, as those skilled in the art will recognize, the various concepts presented throughout this disclosure may be implemented in a RAN, or other suitable access network, to provide UEs with access to types of core networks other than GSM networks.

The core network 104 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The core network 104 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink and downlink between a Node B 108 and a UE 110. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 2:
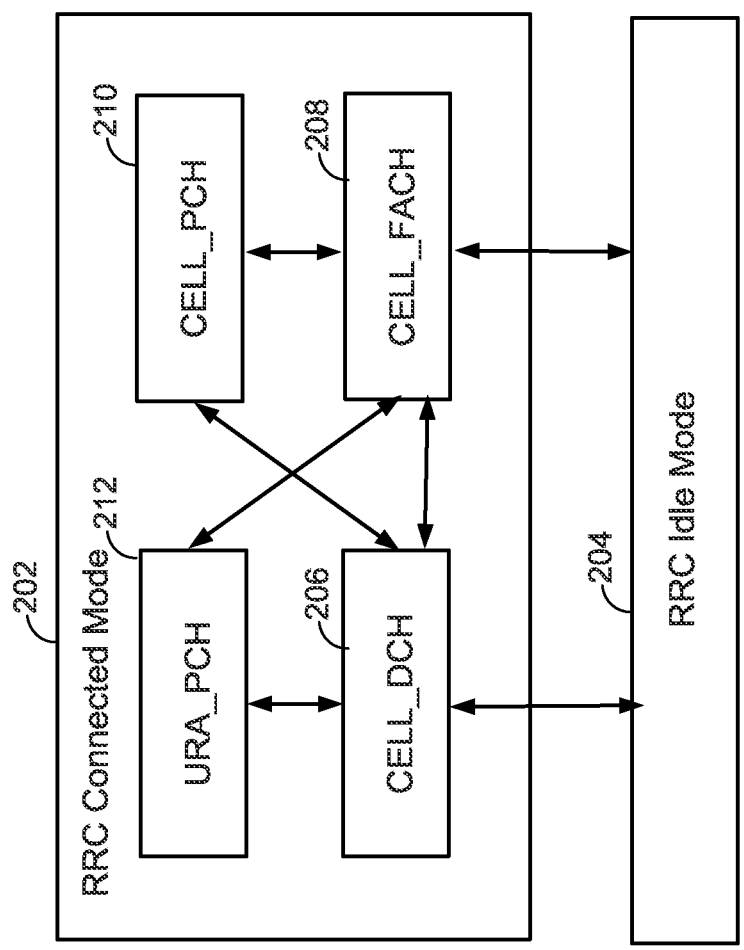
FIG. 2 is a diagram conceptually illustrating general state transitions of radio resource control states of a user equipment.

FIG. 2 illustrates a simplified diagram of general state transitions of RRC states of a UE. There are two main states or modes for the RRC states of the UE, a state 202 (also known as "RRC Connected Mode"), and a state 204 (also known as "RRC Idle Mode"). As the UE 110 communicates with the network such as a UTRAN 102, the UE 110 goes through various RRC states, which is managed by the radio resource control protocol implemented in the UE 110 and the RNC 106. In RRC Connected Mode, the UE 110 is assigned a serving RNC or a network entity, and communicates with the serving RNC using a signaling connection that is known as an RRC connection, and the network knows which cell the UE 110 is in. In RRC Idle Mode, the UE 110 does not have an RRC connection and the network does not know which cell the UE 110 is in.

As shown in FIG. 2, the RRC Connected Mode may comprise four different states: CELL_DCH 206, CELL_FACH 208, CELL_PCH 210, and URA_PCH 212, which depend on the network's knowledge of the UE's location and type of communication between the UE and the network. For example, in CELL_DCH state (also interchangeably used herein as a "cell dedicated channel state"), the network communicates with the UE 110 using a dedicated channel (DCH) for voice calls and packet data. That is, when the UE 110 makes any connection for traffic, e.g., voice call and data call, the UE 110 and the network establish or transition into the CELL_DCH state and most of the traffic are transmitted and received in this state. In a non-dedicated channel state, such as CELL_FACH state (also interchangeably used herein as a "cell forward access channel state"), the network and the UE 110 communicate using common transport channels, such as a random access channel (RACH) and a forward access channel (FACH). The CELL_FACH state is used for signaling messages and small amounts of packet data. Thus, in the CELL_FACH state, the UE 110 can send and receive data but at much lower data rate compared to the CELL_DCH state. Also, the non-dedicated channel state may include CELL_PCH and URA_PCH states. In CELL_PCH state, the UE 110 cannot send and receive user data, but can monitor or receive system information and paging information. The URA_PCH is similar to the CELL_PCH state, and in the URA_PCH state, the UE 110 updates its location when the UE 110 crosses a UTRAN registration area (URA) boundary. A further detailed description of the RRC state transitions of the UE can be found in 3GPP TS 25.331, which is incorporated herein by reference.

For the purpose of further illustrating how the UE 110 can be in different RRC states, an example scenario is provided below. It is assumed that a user of the UE 110 wants to view a certain web page on the Internet. The UE 110 establishes a data connection with the network and downloads the content of the web page onto the UE 110, in which case the UE 110 transitions from the RRC Idle Mode to the cell dedicated channel state (e.g., CELL_DCH state) for receiving data traffic from the network (e.g., the content of the web page via the downlink DCH channel). After the content of the web page has been downloaded onto the UE 110, the user starts viewing the web page. It is noted that while the user is viewing the content of the web page, there may be no traffic between the UE 110 and the network. In fact, there may be no traffic for a long time. To save battery consumption of the UE 110 and critical resources (e.g., DCH channel use), the UE 110 and network may transition to a non-dedicated channel state (e.g., CELL_FACH state), rather than to the RRC Idle Mode. That is, the UE 110 may maintain a partial connection to the network (e.g., in CELL_FACH state), but saves battery and critical resources when there is short data traffic on the air. In other words, the UE 110 and the network may go into the non-dedicated channel state (e.g., CELL_FACH) when there is no user traffic for a certain time period and stay there when there is only a small amount of data traffic. If there is no user traffic for a certain time period, the UE 110 and the network may switch to the CELL_PCH state. This state transition from CELL_DCH to CELL_FACH (or from CELL_FACH to CELL_DCH) may occur frequently depending on the types of user applications on the UE 110 and the amount of user data being transferred between the UE 110 and the network, which may quickly drain the battery on the UE 110.

Further, the state transitions from CELL_DCH to CELL_FACH or from CELL_FACH to CELL_DCH are generally triggered by the network, not by the UE 110. That is, the UE 110 has no direct control over the state transition, and it is up to the network to determine whether and when it switches to other state or not. In an aspect, the present disclosure addresses the limitations in RRC state transitions by allowing the UE some control relating to the RRC state transitions.

Figure 3:
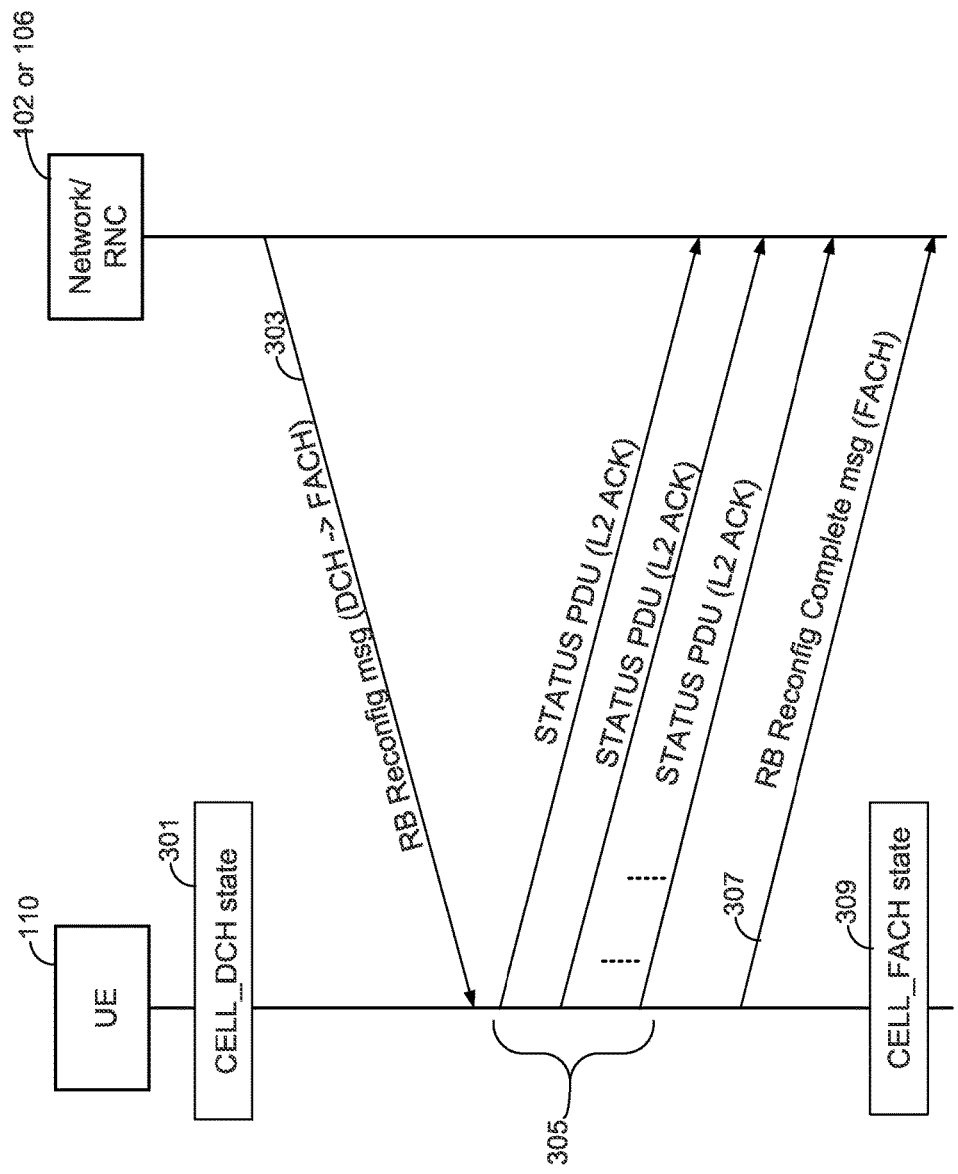
FIG. 3 illustrates an example of a ladder diagram for conceptually illustrating a sequence for transitioning a radio resource control state of the UE in accordance with certain aspects of the present disclosure.

FIG. 3, by way of example, illustrates an example of a ladder diagram for conceptually showing the RRC state transition (e.g., CELL_DCH to CELL_FACH) of the UE 110 initiated by the network. In the example shown in FIG. 3, the UE 110 is operating in a cell dedicated channel state (e.g., CELL_DCH) of the RRC states, at 301, and the network 102 (e.g., RNC 106) decides to transition the UE to a non-dedicated channel state (e.g., CELL_FACH) of the RRC states, for example, because the network 102 determined that there is lack of user traffic on the downlink. The network 102 sends a reconfiguration message, e.g., a radio bearer reconfiguration message (RB Reconfig msg (DCH-→FACH)) 303) to the UE 110. Upon receiving the reconfiguration message, which directs the UE to transition from the CELL_DCH state to the non-dedicated channel state, in an aspect, the UE 110 sends a plurality of layer 2 acknowledgment procedures (e.g., 3 or 4 status packet data units with acknowledgment, that is, STATUS PDU (L2 ACK)) to the network 102 in next possible uplink transmission time intervals (TTIs). In one implementation, the UE 110 may initiate the transition of the RRC state of the UE 110 to the CELL_FACH state right after the transmission of the plurality of layer 2 acknowledgment procedures has been completed, by optionally sending a reconfiguration complete message, e.g., a radio bearer reconfiguration complete message (RB Reconfig Complete msg (FACH) 307) to the network 102 and moving into the CELL_FACH state at 309.

In the examples described herein, although a radio bearer reconfiguration message (or a radio bearer reconfiguration complete message) is provided herein as an example of a reconfiguration message (or a reconfiguration complete message), other messages can be used to transition the UE's RRC state from the cell dedicated channel state to non-dedicated channel state. That is, the information for the RRC state change for the UE may be sent from the network via a message other than a radio bearer reconfiguration message, although the radio bearer reconfiguration message is the most commonly used message for such purposes.

In the example shown in FIG. 3, the STATUS PDU is used to exchange status information between two RLC entities (e.g., RLC entities of the UE 110 and the network 102). The STATUS PDUs are octet aligned, e.g., lengths are multiples of 8 bits. Each STATUS PDU includes a plurality of information bits (e.g., D/C bit, PDU Type bits, and one or Super-Field (SUFI) bits, where D/C bit indicates whether it is a Status PDU or Acknowledged Mode (AM) Data PDU, PDU Type bits indicate the type of Control PDU, and SUFI bits indicate other status information such as acknowledgment.

Further, if downlink traffic PDUs appear in between, because of the network 102 scheduling downlink data between the reconfiguration message (e.g., RB Reconfig msg) and the reconfiguration complete message (e.g., RB Reconfig Complete msg), or DL retransmissions of previously scheduled data before the messages, the UE 110 may acknowledge them separately and/or regularly, regardless of multiple transmissions of the STATUS PDU at 305.

In another aspect of the present disclosure, after transmission of a first STATUS PDU to the network 102, the UE 110 may wait for a certain period of time (or a wait time) before transmitting a second STATUS PDU to the network 102. The wait time can be calculated based on a coherence time. The word "coherence time" is used herein to mean the time duration over which an impulse response of a wireless communication channel is considered to be non-varying. The coherence time for a moving object can be determined using the following expression:

$$\text{Coherence Time}(T_c) = 0.423/f_d, \quad (1)$$

where fd is equal to the maximum Doppler frequency.

For example, using the expression (1), for a UE 110 moving at 120 km/hr transmitting signals in a UMTS frequency band, the maximum Doppler frequency can be determined as 233.3 Hz. In such a case, the coherence time can be determined as 1.8 ms (Tc=0.423/233.3). Thus, in this example, the UE 110 may set the wait time to be 1.8 ms and wait for the wait time after sending the first STATUS PDU to the network 102 prior to sending the second STATUS PDU to the network 102, which is the same as the first STATUS PDU. According to the expression (1), the coherence time would be a longer time period for lower band carriers and/or a low moving speed of the UE 110.

Further, the wait time can be variably determined between multiple transmissions of the STATUS PDU to ensure that UL BLERs experienced by the UE 110 are uncorrelated, and thus a single deep fading can be overcome in the wireless communication system. For example, in one implementation, one or more wait times can be determined in such a way that the time between the first and the last transmission of the STATUS PDU is about X milliseconds (ms), where X is approximately larger than Coherence Time based on speed and carrier frequency of the wireless communication system.

In another aspect of the present disclosure, the UE 110 may vary a number of transmissions of the STATUS PDU based on various factors, such as (i) RRC state transitions observed in the past over a certain period of time, and/or (ii) UL BLER based on channel conditions observed from UL retransmission of other recent RLC PDUs, etc. When UL BLER is used as a factor, the UE 110 can shorten the back to back retransmission time of the STATUS PDU, as the required UL retransmission may be very low.

In the present disclosure, an acknowledgement procedure is a RLC L2 procedure for acknowledgement of a message from the network to the UE in downlink (e.g., a radio bearer reconfiguration message from the network to the UE), which generally consists of a RLC PDU. In another aspect of the present disclosure, the RLC L2 procedure may be implemented using two or more RLC PDUs. Further, in another aspect of the present disclosure, the RLC L2 procedure may be implemented using one or more messages.

Figure 4:
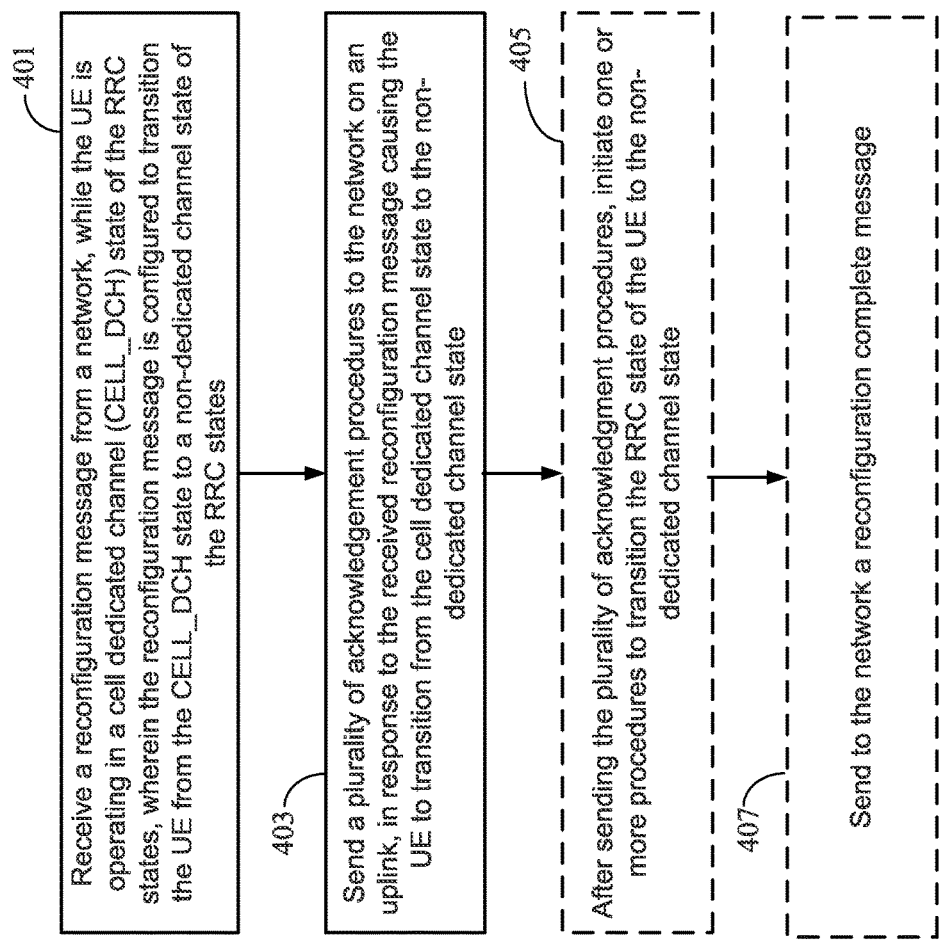
FIG. 4 is an example of a flowchart conceptually illustrating the radio resource control state transitions of the UE in accordance with a certain aspect of the present disclosure.

FIG. 4 is an example flowchart conceptually illustrating the RRC state transitions of the UE in accordance with a certain aspect of the present disclosure. At block 401, while the UE is operating in a cell dedicated channel state (e.g., CELL_DCH) of the RRC states, a reconfiguration message (e.g., a radio bearer reconfiguration message) is received from a network, in which the reconfiguration message is configured to transition the UE from the CELL_DCH state to a non-dedicated channel state (e.g., CELL_FACH) of the RRC states. For example, the RRC state transition component 105 (e.g., the receiving component 51) of the UE 110 receives from the network 102 a radio bearer reconfiguration message, e.g., RB Reconfig msg (DCH→FACH) as shown in FIG. 3, while the UE 110 is in the CELL_DCH state.

At block 403, a plurality of acknowledgment procedures is sent on an uplink, in response to the received reconfiguration message (e.g., the received radio bearer reconfiguration message) causing the UE to transition from the CELL_DCH state to the non-dedicated channel state (e.g., CELL_FACH state). For example, the RRC state transition component 105 (e.g., the sending component 53) of the UE 110 sends to the network 102 the plurality of layer 2 acknowledgment procedures, e.g., STATUS PDU (L2 ACK) shown in FIG. 3, in response to the received radio bearer reconfiguration message to transition the UE's RRC state from CELL_DCH to CELL_FACH. Alternatively, the plurality of acknowledgment procedures may be sent to the network 102 in next possible UL TTIs at different time intervals, e.g., based on different wait times between each retransmission of STATUS PDU to the network 102. As described earlier, the wait time may be based on a coherence time determined by the UE 110.

At block 405, optionally, after sending the plurality of acknowledgment procedures, one or more other procedures may be initiated to transition the UE to the non-dedicated channel state (e.g., CELL_FACH). For example, after the RRC state transition component 105 (e.g., the sending component 53) of the UE 110 completes the multiple transmissions of the STATUS PDU, the RRC state transition component (e.g., the initiating component 55) of the UE 110 may initiate the one or more other procedures to transition the RRC state of the UE to the CELL_FACH state.

At block 407, optionally, a reconfiguration complete message (e.g., a radio bearer reconfiguration complete message) may be sent to the network 102. For example, the RRC state transition component (e.g., the sending component 53) of the UE 110 may send the radio bearer reconfiguration complete message (e.g., RB Reconfig Complete msg in FIG. 3) to the network 102.

Figure 5:
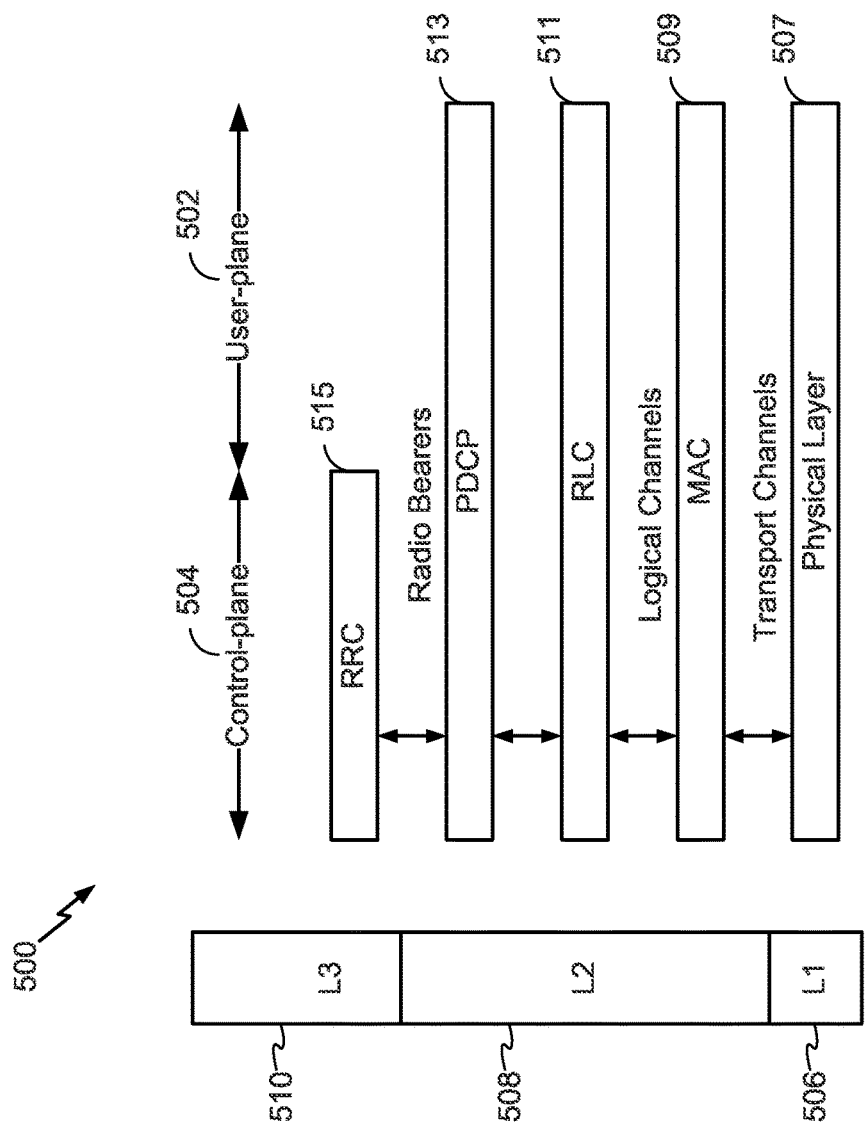
FIG. 5 is a diagram conceptually illustrating a radio protocol architecture relating to a user plane and a control plane.

FIG. 5 is an example of a radio protocol architecture 500 relates to the user plane 502 and the control plane 504 of a UE or node B/base station. For example, the radio protocol architecture 500 may be included in a UE such as the UE 110 (FIG. 1) having the RRC state transition component 105. The radio protocol architecture 500 for the UE and node B is shown with three layers: Layer 1 506, Layer 2 508, and Layer 3 510. Layer 1 506 is the lowest layer and implements various physical layer signal processing functions. As such, Layer 1 506 includes the physical layer 507. Layer 2 (L2 layer) 508 is above the physical layer 507 and is responsible for the link between the UE and node B over the physical layer 507. Layer 3 (L3 layer) 510 includes a radio resource control (RRC) sublayer 515. The RRC sublayer 515 handles the control plane signaling of Layer 3 between the UE and the UTRAN.

In the user plane, the L2 layer 508 includes a media access control (MAC) sublayer 509, a radio link control (RLC) sublayer 511, and a packet data convergence protocol (PDCP) 513 sublayer, which are terminated at the node B on the network side. Although not shown, the UE may have several upper layers above the L2 layer 508 including a network layer (e.g., IP layer) that is terminated at a PDN gateway on the network side, and an application layer that is terminated at the other end of the connection (e.g., far end UE, server, etc.).

The PDCP sublayer 513 provides multiplexing between different radio bearers and logical channels. The PDCP sublayer 513 also provides header compression for upper layer data packets to reduce radio transmission overhead, security by ciphering the data packets, and handover support for UEs between Node Bs. The RLC sublayer 511 provides segmentation and reassembly of upper layer data packets, retransmission of lost data packets, and reordering of data packets to compensate for out-of-order reception due to hybrid automatic repeat request (HARQ). The MAC sublayer 509 provides multiplexing between logical and transport channels. The MAC sublayer 509 is also responsible for allocating the various radio resources (e.g., resource blocks) in one cell among the UEs. The MAC sublayer 509 is also responsible for HARQ operations.

Figure 6:
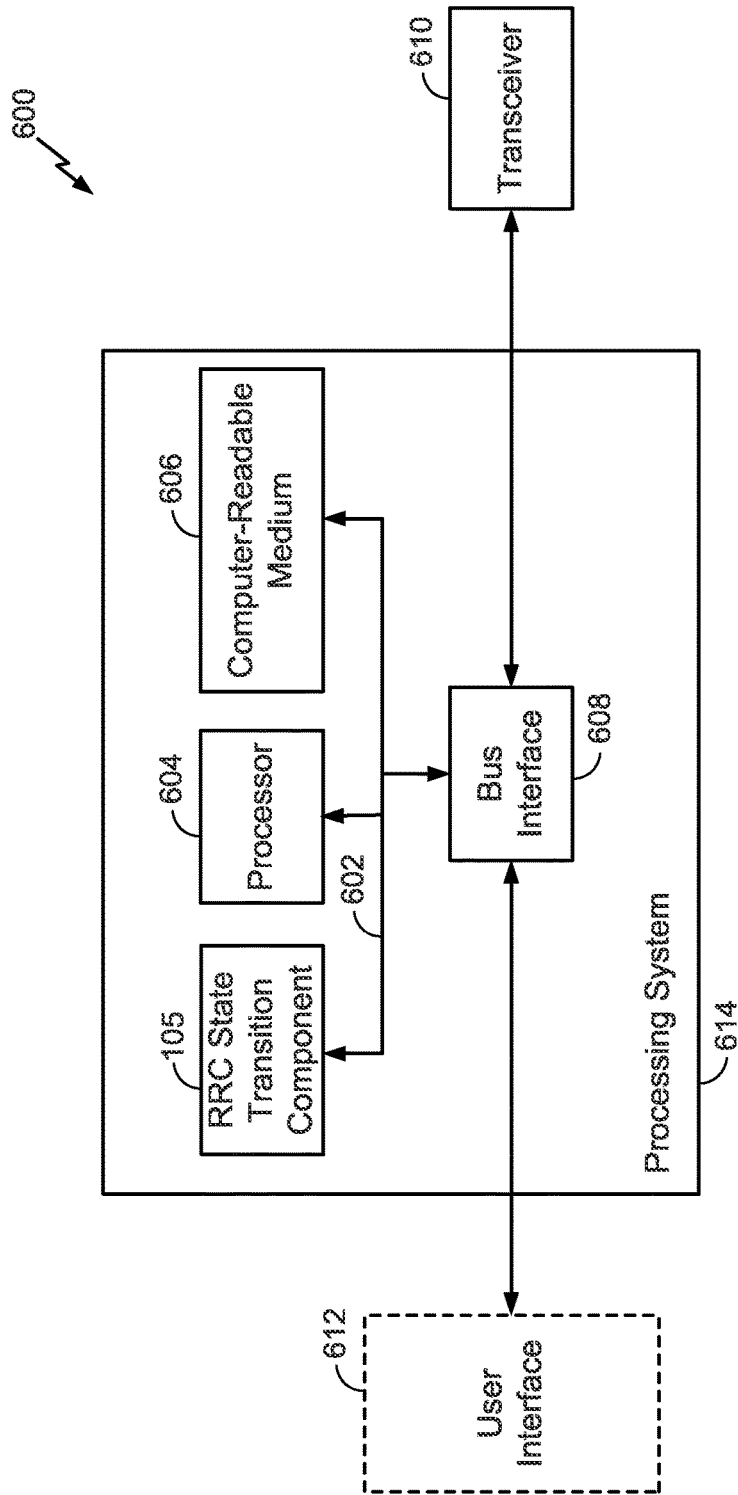
FIG. 6 is a diagram conceptually illustrating an example of a hardware implementation for an apparatus employing a processing system.

FIG. 6 is a diagram conceptually illustrating an example of a hardware implementation for an apparatus 600 employing a processing system 614. In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more RRC state transition components, represented generally by the RRC state transition component 105, one or more processors, represented generally by the processor 604, and computer-readable media, represented generally by the computer-readable medium 606. The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software. The RRC state transition component 105 is responsible for implementing one or more aspects of the present disclosure. However, the one or more aspects of the present disclosure may be implemented by the RRC state transition component 105, the processor 604, computer-readable medium 606, other control logic (including hardware and/or software), or any combinations thereof.

Figure 7:
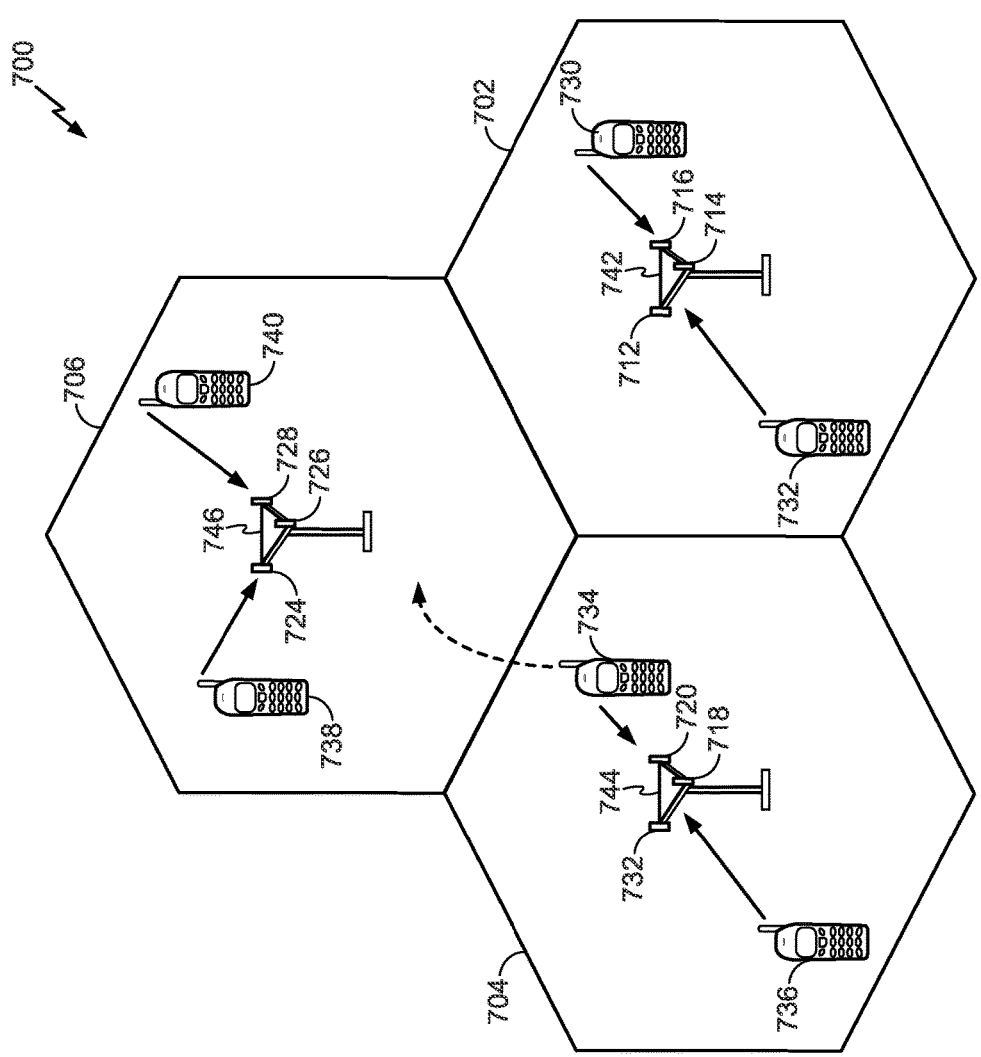
FIG. 7 is a diagram conceptually illustrating an example of an access network.

Referring to FIG. 7, a plurality of user equipments 730, 732, 734, 736, 738, and 740 each having RRC state transition component 105 in an access network 700 in a UTRAN architecture is illustrated. The multiple access wireless communication system includes multiple cellular regions (cells), including cells 702, 704, and 706, each of which may include one or more sectors. The multiple sectors can be formed by groups of antennas with each antenna responsible for communication with UEs in a portion of the cell. For example, in cell 702, antenna groups 712, 714, and 716 may each correspond to a different sector. In cell 704, antenna groups 718, 720, and 722 each correspond to a different sector. In cell 706, antenna groups 724, 726, and 728 each correspond to a different sector. The cells 702, 704 and 706 may include several wireless communication devices, e.g., User Equipment or UEs, which may be in communication with one or more sectors of each cell 702, 704 or 706. For example, UEs 730 and 732 may be in communication with Node B 742, UEs 734 and 736 may be in communication with Node B 744, and UEs 738 and 740 can be in communication with Node B 746. Here, each Node B 742, 744, 746 is configured to provide an access point to a core network 104 (see FIG. 1) for all the UEs 730, 732, 734, 736, 738, 740 in the respective cells 702, 704, and 706.

As the UE 734 moves from the illustrated location in cell 704 into cell 706, a serving cell change (SCC) or handover may occur in which communication with the UE 734 transitions from the cell 704, which may be referred to as the source cell, to cell 706, which may be referred to as the target cell. Management of the handover procedure may take place at the UE 734, at the Node Bs corresponding to the respective cells, at a radio network controller 106 (see FIG. 1), or at another suitable node in the wireless network. For example, during a call with the source cell 704, or at any other time, the UE 734 may monitor various parameters of the source cell 704 as well as various parameters of neighboring cells such as cells 706 and 702. Further, depending on the quality of these parameters, the UE 734 may maintain communication with one or more of the neighboring cells. During this time, the UE 734 may maintain an Active Set, that is, a list of cells that the UE 734 is simultaneously connected to (i.e., the UTRA cells that are currently assigning a downlink dedicated physical channel DPCH or fractional downlink dedicated physical channel F-DPCH to the UE 734 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
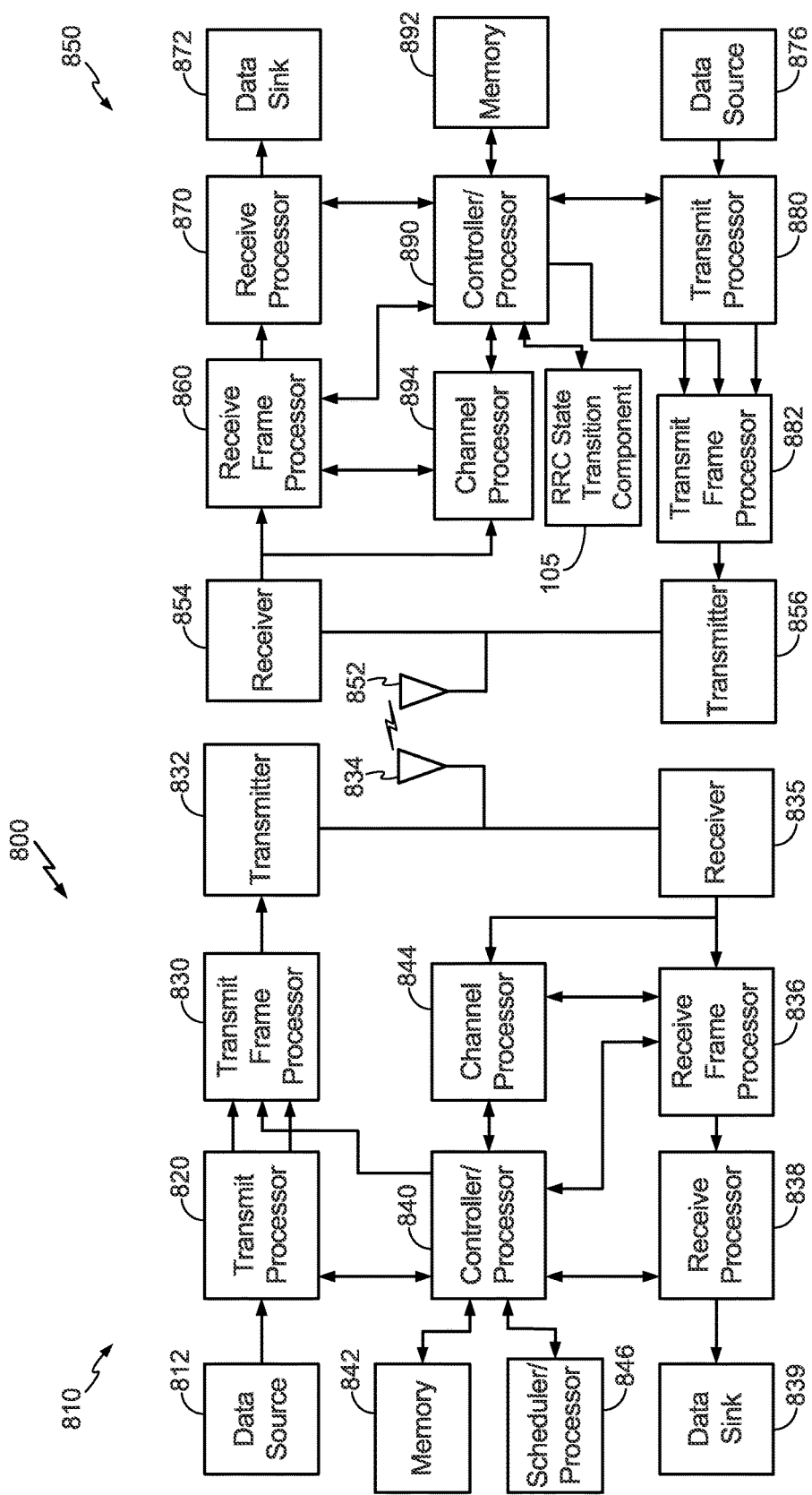
FIG. 8 is a block diagram conceptually illustrating an example of a Node B in communication with a UE in a telecommunications system.

FIG. 8 is a block diagram of a Node B 810 in communication with a UE 850, where the Node B 810 may be the Node B 108 in FIG. 1, and the UE 850 may be the UE 110 in FIG. 1 having the RRC state transition component 105. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the Node B 810. More specifically, the receive processor 870 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receiver processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, and other control functions. The computer readable media of memories 842 and 892 may store data and software for the Node B 810 and the UE 850, respectively. A scheduler/processor 846 at the Node B 810 may be used to allocate resources to the UEs and schedule downlink and/or uplink transmissions for the UEs.

Several aspects of a telecommunications system have been presented with reference to an HSPA system. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, or 35 U.S.C. §112(f), unless the element is expressly recited using the phrase "means for" or, in the case of a method claim, the element is recited using the phrase "step for."

What is claimed is:

1. A method of transitioning radio resource control (RRC) states of a user equipment (UE) for wireless communications, comprising:
    receiving a reconfiguration message from a network, while the UE is in a cell dedicated channel (CELL_DCH) state of the RRC states, wherein the reconfiguration message is configured to transition the UE from the CELL_DCH state to a non-dedicated channel state of the RRC states; and
    sending a plurality of acknowledgement procedures to the network on an uplink, in response to the received reconfiguration message causing the UE to transition from the CELL_DCH state of the RRC states to the non-dedicated channel state of the RRC states,
    wherein a number of the plurality of acknowledgement procedures is determined based at least on previous RRC state transitions of the UE, and
    wherein each of the plurality of acknowledgement procedures comprises a same status packet data unit (PDU), and each of the same status PDU includes acknowledgement information of the received reconfiguration message from the network.

2. The method of claim 1, wherein the reconfiguration message is a radio bearer reconfiguration message and the non-dedicated channel state of the RRC states is a cell forward access channel (CELL_FACH) state of the RRC states.

3. The method of claim 1, wherein sending the plurality of acknowledgement procedures to the network on the uplink comprises sending the plurality of acknowledgement procedures to the network on the uplink, based on a coherence time that is determined based on a speed of the UE and a carrier frequency of a currently serving cell of the UE.

4. The method of claim 1, wherein a number of the plurality of the acknowledgement procedures is determined based at least on an estimated uplink block error rate (BLER).

5. The method of claim 1, wherein the network comprises a high speed packet access (HSPA) type system.

6. An apparatus for transitioning radio resource control (RRC) states of a user equipment (UE) for wireless communications, comprising:
    means for receiving a reconfiguration message from a network, while the UE is in a cell dedicated channel (CELL_DCH) state of the RRC states, wherein the reconfiguration message is configured to transition the UE from the CELL_DCH state to a non-dedicated channel state of the RRC states; and
    means for sending a plurality of acknowledgement procedures to the network on an uplink, in response to the received reconfiguration message causing the UE to transition from the CELL_DCH state of the RRC states to the non-dedicated channel state of the RRC states,
    wherein a number of the plurality of acknowledgement procedures is determined based at least on previous RRC state transitions of the UE, and
    wherein each of the plurality of acknowledgement procedures comprises a same status packet data unit (PDU), and each of the same status PDU includes acknowledgement information of the received reconfiguration message from the network.

7. The apparatus of claim 6, wherein the reconfiguration message is a radio bearer reconfiguration message and the non-dedicated channel state of the RRC states is a cell forward access channel (CELL_FACH) state of the RRC states.

8. The apparatus of claim 6, wherein the means for sending the plurality of acknowledgement procedures to the network on the uplink comprises means for sending the plurality of acknowledgement procedures to the network on the uplink, based on a coherence time that is determined based on a speed of the UE and a carrier frequency of a currently serving cell of the UE.

9. The apparatus of claim 6, wherein a number of the plurality of the acknowledgement procedures is determined based at least on estimated uplink block error rate (BLER).

10. The apparatus of claim 6, wherein the network comprises a high speed packet access (HSPA) type system.

11. A user equipment (UE) for wireless communications, comprising:
a receiver configured to receive a reconfiguration message from a network, while the UE is in a cell dedicated channel (CELL_DCH) state of radio resource control (RRC) states, wherein the reconfiguration message is configured to transition the UE from the CELL_DCH state to a non-dedicated channel state of the RRC states; and
a transmitter configured to send a plurality of acknowledgement procedures to the network on an uplink, in response to the received reconfiguration message causing the UE to transition from the CELL_DCH state of the RRC states to the non-dedicated channel state of the RRC states,
wherein a number of the plurality of acknowledgement procedures is determined based at least on previous RRC state transitions of the UE, and
wherein each of the plurality of acknowledgement procedures comprises a same status packet data unit (PDU), and each of the same status PDU includes acknowledgement information of the received reconfiguration message from the network.

12. The UE of claim 11, wherein the reconfiguration message is a radio bearer reconfiguration message and the non-dedicated channel state of the RRC states is a cell forward access channel (CELL_FACH) state of the RRC states.

13. The UE of claim 11, wherein the transmitter is further configured to send the plurality of acknowledgement procedures to the network on the uplink, based on a coherence time that is determined based on a speed of the UE and a carrier frequency of a currently serving cell of the UE.

14. The UE of claim 11, wherein a number of the plurality of the acknowledgement procedures is determined based at least on an estimated uplink block error rate (BLER).

15. The UE of claim 11, wherein the network comprises a high speed packet access (HSPA) type system.

16. A non-transitory computer readable medium storing computer executable code, comprising:
code for receiving a reconfiguration message from a network, while a user equipment (UE) is in a cell dedicated channel (CELL_DCH) state of radio resource control (RRC) states, wherein the reconfiguration message is configured to transition the UE from the CELL_DCH state to a non-dedicated channel state of the RRC states; and
code for sending a plurality of acknowledgement procedures to the network on an uplink, in response to the received reconfiguration message causing the UE to transition from the CELL_DCH state of the RRC states to the non-dedicated channel state of the RRC states,
wherein a number of the plurality of acknowledgement procedures is determined based at least on previous RRC state transitions of the UE, and
wherein each of the plurality of acknowledgement procedures comprises a same status packet data unit (PDU), and each of the same status PDU includes acknowledgement information of the received reconfiguration message from the network.

17. The non-transitory computer readable medium of claim 16, wherein the reconfiguration message is a radio bearer reconfiguration message and the non-dedicated channel state is a cell forward access channel (CELL_FACH) state of the RRC states.

18. The non-transitory computer readable medium of claim 16, wherein sending the plurality of acknowledgement procedures to the network on the uplink comprises sending the plurality of acknowledgement procedures to the network on the uplink, based on a coherence time that is determined based on a speed of the UE and a carrier frequency of a currently serving cell of the UE.

19. The non-transitory computer readable medium of claim 16, wherein a number of the plurality of the acknowledgement procedures is determined based at least on an estimated uplink block error rate (BLER).

20. The non-transitory computer readable medium of claim 16, wherein the network comprises a high speed packet access (HSPA) type system.

* * * * *